United States Patent
Legl

(10) Patent No.: US 12,246,586 B2
(45) Date of Patent: Mar. 11, 2025

(54) ELECTRIC AXLE ARRANGEMENT AND DRIVE TRAIN FOR A MOTOR VEHICLE HAVING AN ELECTRIC AXLE ARRANGEMENT OF THIS KIND

(71) Applicant: MAGNA Powertrain GmbH & Co KG, Lannach (AT)

(72) Inventor: Lukas Legl, Graz (AT)

(73) Assignee: MAGNA Powertrain GmbH & Co KG, Lannach (AT)

( * ) Notice: Subject to any disclaimer, the term of this patent is extended or adjusted under 35 U.S.C. 154(b) by 322 days.

(21) Appl. No.: 18/015,146

(22) PCT Filed: May 7, 2021

(86) PCT No.: PCT/EP2021/062170
§ 371 (c)(1),
(2) Date: Jan. 9, 2023

(87) PCT Pub. No.: WO2022/012797
PCT Pub. Date: Jan. 20, 2022

(65) Prior Publication Data
US 2023/0249529 A1    Aug. 10, 2023

(30) Foreign Application Priority Data

Jul. 13, 2020  (DE) .................. 10 2020 208 725.3

(51) Int. Cl.
*B60K 11/02*    (2006.01)
*B60K 1/00*    (2006.01)

(52) U.S. Cl.
CPC ............. *B60K 1/00* (2013.01); *B60K 11/02* (2013.01); *B60K 2001/001* (2013.01); *B60K 2001/006* (2013.01)

(58) Field of Classification Search
CPC .... B60K 1/00; B60K 11/02; B60K 2001/001; B60K 2001/006
See application file for complete search history.

(56) References Cited

U.S. PATENT DOCUMENTS 10,690,234 B1 *  6/2020  Oury, Jr. ............... B60K 11/02
2009/0320642 A1 * 12/2009  Fuhrer ..................... F28F 27/02
                                                        165/185
(Continued)

FOREIGN PATENT DOCUMENTS

DE    102018211360 A1    1/2020
JP    2012126191 A       7/2012
WO    2007096719 A1      8/2007

OTHER PUBLICATIONS

European Patent Office, Rijswijk, Netherlands, International Search Report of International Application No. PCT/EP2021/062170, Mailed Jun. 18, 2021, 2 pages.

(Continued)

*Primary Examiner* — Erez Gurari
(74) *Attorney, Agent, or Firm* — Dickinson Wright PLLC

(57) ABSTRACT

An electric axle arrangement for a drive train of a motor vehicle includes a drivable axle that is or can be drivingly connected to an electric machine, a coolant sump with liquid coolant, and an elevated tank, wherein the liquid coolant is delivered from the coolant sump into the elevated tank via a gearwheel attached to the axle. The elevated tank is connected to a cooling system for cooling the electric machine via a switchable valve. When the valve is closed during an idling operation, the return flow of the coolant into the coolant sump via the cooling system is prevented, and drag losses in the idling operation of the electric machine are reduced, because more coolant collects in the elevated tank and the gearwheel therefore encounters a reduced quantity of coolant in the sump.

20 Claims, 2 Drawing Sheets

(56) References Cited

U.S. PATENT DOCUMENTS

| | | | | |
|---|---|---|---|---|
| 2014/0062048 | A1* | 3/2014 | Schlangen | B60W 30/1886 |
| | | | | 280/124.111 |
| 2014/0262675 | A1* | 9/2014 | Sugiyama | F16H 57/0483 |
| | | | | 192/85.01 |
| 2016/0131245 | A1* | 5/2016 | Imai | F16H 57/0446 |
| | | | | 476/8 |
| 2017/0067558 | A1* | 3/2017 | Knoth | F16H 61/686 |
| 2017/0210315 | A1 | 7/2017 | Nakajima et al. | |
| 2019/0052146 | A1* | 2/2019 | Decaux | H02K 9/19 |
| 2021/0159761 | A1* | 5/2021 | Dumas | H02K 9/19 |
| 2021/0309099 | A1* | 10/2021 | Long | B60K 1/00 |
| 2022/0029508 | A1* | 1/2022 | Gupta | H02K 3/24 |
| 2023/0249529 | A1* | 8/2023 | Legl | B60K 1/00 |
| | | | | 180/65.1 |
| 2024/0333104 | A1* | 10/2024 | Greiter | H02K 9/193 |

OTHER PUBLICATIONS

Wikipedia—die freie Enzyklopädie, "Motorschmierung," Version vom Dec. 3, 2020, URL: https://de.wikipedia.org/w/index.phptitle=Motorschmierung&oldid=197699122[abgerufen am Sep. 3, 2021].

* cited by examiner

ELECTRIC AXLE ARRANGEMENT AND DRIVE TRAIN FOR A MOTOR VEHICLE HAVING AN ELECTRIC AXLE ARRANGEMENT OF THIS KIND

CROSS-REFERENCE TO RELATED APPLICATIONS

This application is a National Stage of International Application No. PCT/EP2021/062170, filed May 7, 2021, which claims priority to DE 10 2020 208 725.3, filed Jul. 13, 2020. The entire disclosures of each of the above applications are incorporated herein by reference.

FIELD

The present disclosure relates to an electric axle arrangement for a drive train of a motor vehicle, a drivable axle, an electric machine, wherein the axle is or can be drivingly connected to the electric machine, a coolant sump with liquid coolant, and an elevated tank, wherein the liquid coolant can be delivered from the coolant sump into the elevated tank. The present disclosure furthermore relates to a drive train for a motor vehicle having at least one such electric axle arrangement.

BACKGROUND

This section provides information related to the present disclosure which is not necessarily prior art.

For most of its useful life, a secondary drive of a motor vehicle will be dragged along in idling operation. In the case of electric secondary motor vehicle axles, it is necessary to cool an electric machine associated with this axle as needed. Generally, electric machines are cooled by means of a liquid coolant, for example oil, wherein the delivery of the liquid coolant causes drag losses.

SUMMARY

This section provides a general summary of the present disclosure, and is not a comprehensive disclosure of its full scope or all of its features.

An object of the present disclosure is to specify an improved electric axle arrangement for a drive train of a motor vehicle. An object of the present disclosure is furthermore to specify an improved drive train for a motor vehicle having such an electric axle arrangement, which is notable in particular for reduced drag losses and, as a further consequence, optimized ranges of the motor vehicle in electric mode.

This need may be met by the subject matter of the present disclosure described herein. Advantageous embodiments of the present disclosure are described through the specification and detailed description herein.

The electric axle arrangement of the present disclosure for a drive train of a motor vehicle includes a drivable axle, an electric machine, wherein the axle is or can be drivingly connected to the electric machine, a coolant sump with liquid coolant, and an elevated tank, wherein the liquid coolant can be delivered from the coolant sump into the elevated tank.

According to the present disclosure, the elevated tank can be fluidically connected to a cooling system for cooling the electric machine via a switchable valve.

In an advantageous embodiment variant, the axle can be drivingly connected to the electric machine via a switching unit. In this case, the valve can likewise be switched via the switching unit.

The switching unit preferably cooperates adjustingly with the valve in such a way that, in a first operating state of the switching unit, namely in an operating state in which the electric machine is drivingly connected to the axle, the valve is opened, and, in a second operating state of the switching unit, namely in an operating state in which the electric machine is not drivingly connected to the axle, the valve is closed.

In an alternative embodiment variant, the valve is designed such that it can be switched magnetically.

The drive train of the present disclosure for a motor vehicle includes at least one electric axle arrangement of the present disclosure.

By way of the present disclosure of the electric axle arrangement and as a further consequence of the drive train of a motor vehicle, it is possible, with a simple construction with fewer components and reduced costs, to reduce the drag losses to the greatest extent possible and to therefore achieve optimized operation of the electric axle arrangement. By using at least one such electric axle arrangement in a drive train of a motor vehicle, increased ranges, in particular in electric mode, may be achieved as a result of the reduced drag losses at the axle level.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
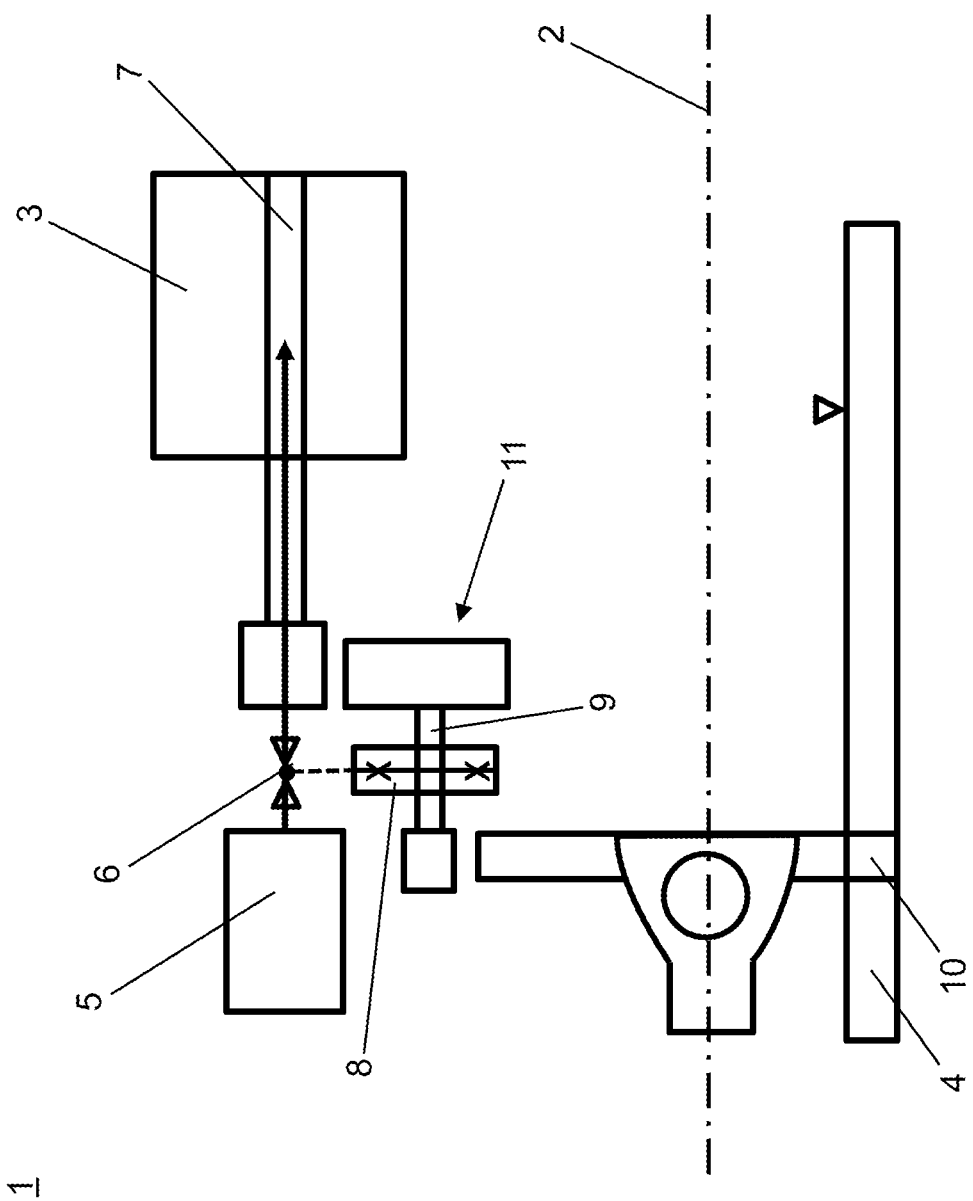
FIG. 1 is a schematic illustration of a first exemplary embodiment of an electric axle arrangement.
Figure 2:
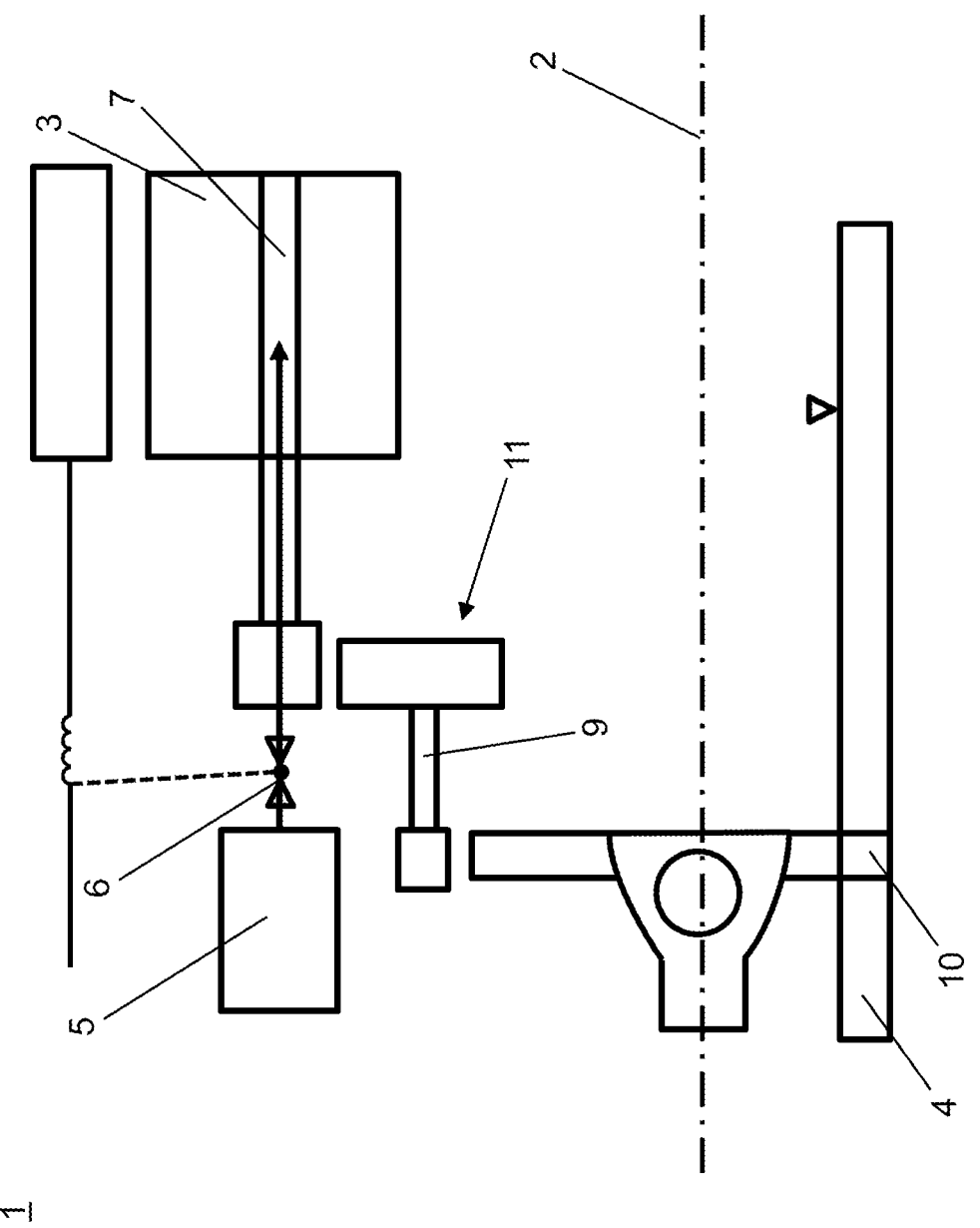
FIG. 2 is a schematic illustration of a second exemplary embodiment of an electric axle arrangement.

An example of an inventive electric axle arrangement 1 for a drive train of a motor vehicle is illustrated schematically in each case in FIG. 1 and FIG. 2. Each of the two electric axle arrangements 1 includes a drivable axle 2, an electric machine 3, a coolant sump 4, an elevated tank 5, a valve 6, and a cooling system 7.

The electric machine 3 is or can be drivingly connected to the axle 2 via a gear arrangement 11.

The coolant sump 4 contains a liquid coolant. In this context, liquid coolant is understood to refer to oil.

The liquid coolant may be delivered from the coolant sump 4 into the elevated tank 5. In the two present exemplary embodiments according to FIG. 1 and FIG. 2, this takes place via a rotating gearwheel 10 ("final drive"), which dips partially into the coolant sump 4, and suitable conducting devices (not illustrated).

The cooling system 7 serves for cooling the electric machine 3.

In both embodiment variants, the elevated tank 5 can be fluidically connected to the cooling system 7 for cooling the electric machine 3 via the switchable valve 6. The coolant flows out of the cooling system 7 of the electric machine 3 and back into the coolant sump 4.

An exemplary first embodiment variant of an electric axle arrangement 1 according to the present disclosure is illustrated schematically in FIG. 1. In this first embodiment variant, a switching unit 8 is arranged on an intermediate shaft 9 of the gear arrangement 11. The electric machine 3 may be drivingly connected to the axle 2 via this switching unit 8.

The switching unit 8 is furthermore adjustingly connected to the switchable valve 6, and, more precisely, the switching unit 8 cooperates adjustingly with the valve 6 in such a way that, in a first operating state of the switching unit 8, namely in an operating state in which the electric machine 3 is drivingly connected to the axle 2, the valve 6 is opened, and, in a second operating state of the switching unit 8, namely in an operating state in which the electric machine 3 is not drivingly connected to the axle 2, the valve 6 is closed.

If the electric machine 3 is uncoupled from the axle 2 via the switching unit 8 in idling operation, the intermediate shaft 9 and the gearwheel 10 still rotate with the axle 2. As a result of this rotation, the gearwheel 10 delivers coolant from the coolant sump 4 into the elevated tank 5. By using the valve 6, which is switched accordingly, namely closed, via the switching unit 8 in the second operating state of the switching unit 8, the return flow of the coolant from the elevated tank 5 into the coolant sump 4 via the cooling system 7 may be prevented, and the drag losses in the second operating state of the switching unit 8 may therefore be reduced, because more coolant collects in the elevated tank 5 and the gearwheel 10 therefore splashes around in a reduced quantity of coolant.

If the electric machine 3 is coupled to the axle 2 again (first operating state of the switching unit 8), the valve 6 is opened via the switching unit 8 and the coolant system 7 for cooling the electric machine 3 is again supplied with coolant from the elevated tank 8.

An exemplary second embodiment variant of an inventive electric axle arrangement 1 is illustrated schematically in FIG. 2. In this exemplary embodiment, the switching unit 8 is omitted and the electric machine 3 is permanently drivingly connected to the axle 2. The valve 6 is designed such that it can be controlled magnetically.

If the electric machine 3 is in idling operation in this case, coolant is constantly delivered from the coolant sump 4 into the cooling system 7 of the electric machine 3 via the gearwheel 10 and the elevated tank 5, which could result in excessively high drag losses. By using the valve 6, which is switched magnetically, namely closed in idling operation of the electric machine 3, the return flow of the coolant from the elevated tank 5 into the coolant sump 4 via the cooling system 7 may be prevented, and the drag losses in idling operation of the electric machine 3 may therefore be reduced, because more coolant collects in the elevated tank 5 and the gearwheel 10 therefore splashes around in a reduced quantity of coolant.

If the electric machine 3 drives the axle 2, the valve 6 may be magnetically opened and cooling of the electric machine 3 via the cooling system 7 may therefore take place.

LIST OF REFERENCE DESIGNATIONS

1 Electric axle arrangement
2 Axle
3 Electric machine
4 Coolant sump
5 Elevated tank
6 Valve
7 Cooling system
8 Switching unit
9 Intermediate shaft
10 Gearwheel
11 Gear arrangement

What is claimed is:

1. An electric axle arrangement for a drive train of a motor vehicle, comprising
   a drivable axle,
   an electric machine, wherein the axle is or can be drivingly connected to the electric machine,
   a coolant sump with liquid coolant and
   an elevated tank, wherein the liquid coolant is delivered from the coolant sump into the elevated tank,
   wherein the elevated tank is selectively fluidically connected to a cooling system for cooling the electric machine via a switchable valve.

2. The electric axle arrangement as claimed in claim 1, wherein the axle is selectively drivingly connected to the electric machine via a switching unit.

3. The electric axle arrangement as claimed in claim 2, wherein the valve is switched via the switching unit.

4. The electric axle arrangement as claimed in claim 3, wherein the switching unit cooperates with the valve such that, in an first operating state of the switching unit, the valve is opened, and, in a second operating state of the switching unit, the valve is closed.

5. The electric axle arrangement as claimed in claim 1, wherein the valve is switched magnetically.

6. A drive train for a motor vehicle, comprising at least one electric axle arrangement as claimed in claim 1.

7. The electric axle arrangement as claimed in claim 1, wherein the axle is permanently drivingly connected to the electric machine.

8. The electric axle arrangement as claimed in claim 7, wherein a gearwheel fixed to the axle interacts with the sump and delivers coolant from the coolant sump to the elevated tank during rotation.

9. The electric axle as claimed in claim 2, wherein a gearwheel fixed to the axle interacts with the sump and delivers coolant from the coolant sump to the elevated tank during rotation.

10. The electric axle as claimed in claim 4, wherein the first operating state is an operating state in which the axle is drivingly connected to the electric machine, and the second operating state is an operating state in which the axle is not drivingly connected to the electric machine.

11. The electric axle as claimed in claim 10, wherein in the first operating state when the valve is open coolant returns from the elevated tank to the sump.

12. The electric axle as claimed in claim 11, wherein in the second operating state when the valve is closed, return flow of the coolant from the elevated tank into the sump is prevented.

13. The electric axle as claimed in claim 12, wherein a gearwheel attached to the axle interacts with the sump and delivers coolant from the coolant sump to the elevated tank during rotation.

14. The electric axle as claimed in claim 13, wherein in the second operating state when the valve is closed, coolant collects in the elevated tank and the gearwheel interacts with a reduced quantity of coolant in the sump to reduce drag losses.

15. The electric axle as claimed in claim 1, wherein when the valve is open, coolant flows from the elevated tank to the electric machine via the cooling system and flows out of the cooling system back to the sump, and, when the valve is closed coolant is prevented from returning to the sump.

16. The electric axle as claimed in claim 15, wherein the electric machine is drivingly connected to the axle via a gear arrangement.

17. The electric axle as claimed in claim 16, wherein a final drive of the gear arrangement is in the form of a gearwheel attached to the axle, wherein the gearwheel rotates with the axle and dips at least partially into the sump, wherein the gearwheel delivers coolant to the elevated tank during rotation.

18. The electric axle as claimed in claim 1, wherein the valve is closed during idling operation of the electric machine, whereby coolant does not return to the sump during idling operation and a reduced quantity of coolant is present in the sump, whereby drag losses are reduced based on the reduced quantity of coolant.

19. The electric axle as claimed in claim 18, wherein an increased quantity of coolant collects in the elevated tank when the valve is closed and the reduced quantity of coolant is present in the sump.

20. The electric axle as claimed in claim 19, wherein coolant in the sump is reduced in response to a gearwheel that is at least partially disposed in the sump delivering coolant from the sump to the elevated tank, wherein the coolant that is delivered to the elevated tank does not return to the sump when the valve is closed.

\* \* \* \* \*